(12) United States Patent
Cormier (10) Patent No.: US 8,317,137 B2
(45) Date of Patent: Nov. 27, 2012

(54) SWITCHABLE ARTICLE AND DEVICE TO GENERATE A LATERAL OR TRANSVERSE CASIMIR FORCE FOR PROPULSION, GUIDANCE AND MANEUVERING OF A SPACE VEHICLE

(76) Inventor: Denny Charles Cormier, Newport News, VA (US)

(*) Notice: Subject to any disclaimer, the term of this patent is extended or adjusted under 35 U.S.C. 154(b) by 0 days.

(21) Appl. No.: 12/768,719

(22) Filed: Apr. 27, 2010

(65) Prior Publication Data

US 2010/0237198 A1 Sep. 23, 2010

Related U.S. Application Data

(63) Continuation-in-part of application No. 11/561,839, filed on Nov. 20, 2006, now abandoned.

(51) Int. Cl.
*B64G 1/40* (2006.01)

(52) U.S. Cl. .................................. 244/171.5; 244/171.1

(58) Field of Classification Search ............... 244/171.5, 244/171.1; 310/308
See application file for complete search history.

(56) References Cited

U.S. PATENT DOCUMENTS

| | | | | |
|---|---|---|---|---|
| 4,486,265 A * | 12/1984 | Little | ............................... | 117/54 |
| 5,018,180 A | 5/1991 | Shoulders | | |
| 5,590,031 A | 12/1996 | Mead, Jr. et al. | | |
| 6,477,028 B1 | 11/2002 | Pinto | | |
| 6,593,566 B1 | 7/2003 | Pinto | | |
| 6,650,527 B1 | 11/2003 | Pinto | | |
| 6,665,167 B2 | 12/2003 | Pinto | | |
| 6,742,380 B2 | 6/2004 | Johnston | | |
| 6,842,326 B2 | 1/2005 | Pinto | | |
| 6,920,032 B2 | 7/2005 | Pinto | | |
| 7,379,286 B2 | 5/2008 | Haisch et al. | | |
| 7,411,772 B1 | 8/2008 | Tymes | | |
| 8,039,368 B2 * | 10/2011 | Drndic et al. | ................. | 438/478 |
| 2004/0074533 A1 * | 4/2004 | Pan | ................ | 136/255 |
| 2006/0027709 A1 * | 2/2006 | Pinto | ......................... | 244/171.1 |
| 2007/0007393 A1 | 1/2007 | Pinto | | |
| 2007/0241470 A1 * | 10/2007 | Haisch et al. | ................ | 264/1.27 |
| 2009/0322221 A1 * | 12/2009 | Makansi | ....................... | 313/523 |
| 2010/0142259 A1 * | 6/2010 | Drndic et al. | ................ | 365/158 |

OTHER PUBLICATIONS

Lifshitz, EM., The Theory of Molecular Attractive Forces Between Solids, J. Experimental Theoretical Physics, 1955, vol. 29, pp. 94-110, USSR (Russia),(Republished in USSR).

(Continued)

*Primary Examiner* — Philip J Bonzell (57) ABSTRACT

An article and device are provided comprising a switchable microstructure or nanostructure array of non-parallel conducting plates, supported by a plurality of shaped prismatic oxide stages upon layered conductive and substrate-base materials, for directly generating a lateral or transverse Casimir force. Illustrative embodiments include a device for switchable generation of lateral or transverse Casimir force components that work in an orthogonal direction to normal Casimir forces which can be externally switched "on" or "off" electronically, mechanically or thermally by using a semiconductor PN-junction or superconductor to produce a thrust for guidance, maneuvering and propulsion of a manned or unmanned space vehicle, or in other novel applications requiring generation of precisely switched or continuous forces.

10 Claims, 6 Drawing Sheets

OTHER PUBLICATIONS

Trondle, M. et. al., Normal and lateral critical Casimir forces between colloids and patterned substrates, Europhysics Letters, Nov. 2009, pp. 1-6, vol. 88, 40004, France.

Katzenmeyer, A. et. al, Impact of Casimir Force in Molecular Electronic Switching Junctions, 2nd IEEE Intl Nanoelectronics Conference, Mar. 24-27, 2008. pp. 166-169, China.

Munday, JN. et. al., Measured long-range repulsive Casimir-Lifshitz forces, Nature, Jan. 2009, vol. 457, No. 8, doi:10.1038/nature07610, London, UK.

Serry, FM. et. al., The role of the Casimir effect in the static deflection and stiction of membrane strips in MEMS, J. Appl. Phys., vol. 84, No. 5, Sep. 1, 1998, Melville, NY.

Deutsch D., Candelas P., Boundary Effects in Quantum Field Theory, Phys. Rev. D 20, 3063 ~1979, NY.

Brevik I., Lygren M., and Marachevsky VN., Casimir-Polder Effect for a Perfectly Conducting Wedge, Annals of Physics 267 (1998), pp. 134-142, NY.

\* cited by examiner

SWITCHABLE ARTICLE AND DEVICE TO GENERATE A LATERAL OR TRANSVERSE CASIMIR FORCE FOR PROPULSION, GUIDANCE AND MANEUVERING OF A SPACE VEHICLE

CROSS-REFERENCE TO RELATED APPLICATIONS

This application is a continuation-in-part of U.S. patent application Ser. No. 11/561,839, filed Nov. 20, 2006 now published as U.S. Patent Application Publication No. 20080296437, the content of which is incorporated herein by reference, in its entirety. Applicant claims full rights and benefits afforded by the previously disclosed subject matter pursuant to 35 U.S.C. Section 120. Furthermore, this application claims priority related to Disclosure Document No. 580518, entitled "Method and Apparatus for a Transverse Casimir Force Generator", filed on Jun. 16, 2005. Moreover, this application claims priority from Provisional Application Ser. No. 60/738,847, entitled "Method and Apparatus for a Transverse Casimir Force Generator", filed Nov. 22, 2005, and co-pending Utility patent application Ser. No. 11/561,839 entitled "Method and Device to Generate a Transverse Casimir Force for Propulsion, Guidance and Maneuvering of a Space Vehicle", filed Nov. 20, 2006. In addition, this application claims priority from Provisional Application Ser. No. 61/010,436, entitled "Method and Device for Generating a Cormier-Casimir Force Under Computer Control", filed Jan. 9, 2008. All the above cross-references are hereby incorporated by reference in their entirety.

FIELD OF THE INVENTION

The present invention involves switchable microstructure or nanostructure articles and devices for generating a lateral or transverse Casimir force by using an array of non-parallel conducting plates and an intervening dielectric or semiconductor material to provide propulsion in manned or unmanned space vehicles.

BACKGROUND OF THE INVENTION

Hendrick B. G. Casimir first demonstrated in 1948 that significant forces can arise from myriad bombardment of transitory "virtual particles" when they collide with matter. In accordance with the principles of quantum electrodynamics, these ubiquitous virtual particles exist throughout the universe, including the vacuum of outer space, forming a kind of chaotic "quantum foam" at the subatomic level. Moreover, these virtual particles continually form and disappear as a consequence of the so-called "vacuum energy", also known as "zero-point energy" (ZPE), which exists even at absolute zero.

As Dr. Casimir noted in his original work, the presence of conducting materials directly affects the formation of ZPE virtual particles. In particular, he found that a force was generated on closely-spaced parallel conducting plates due to exclusion of lower-energy ZPE virtual particles between the plates. In explicit terms, the magnitude of the normal Casimir force, $F_c$, perpendicular to perfectly conducting parallel plates having a vacuum between them, can be expressed as:

$$F_c = \frac{\pi^2 \hbar c A}{240 a^4} \quad \text{Equation 1}$$

where h is the reduced Planck constant, c is the speed of light, A is the area of the plates and a is the distance between the plates.

However, due to limitations of instrumentation and the inability to manufacture complex nanostructures at that time, Dr. Casimir was unable to measure this force to any great accuracy. With the advent of much more precise instrumentation in the early 1990's, the Casimir force for parallel conducting plates has since been repeatedly measured in many laboratories around the world and found to be in agreement with his original work to accuracies better than 5%. Quite recently, the U.S. National Aeronautics and Space Administration (NASA) commissioned the University of Alabama at Huntsville to measure the Casimir force to a high degree of accuracy. Their results have coincided with Dr. Casimir's formula to within a few percent (see REFERENCES).

Based upon measurements and computations, the present inventor recognized that a lateral or transverse Casimir-like force can be generated between two non-parallel conducting plates which is directed in the plane of the plates instead of perpendicular to them. A component of this lateral or transverse Casimir force was first measured by Chen and Mohideen in 2002 between symmetrical corrugated conducting surfaces giving rise to a lateral oscillating force.

Figure 2A:
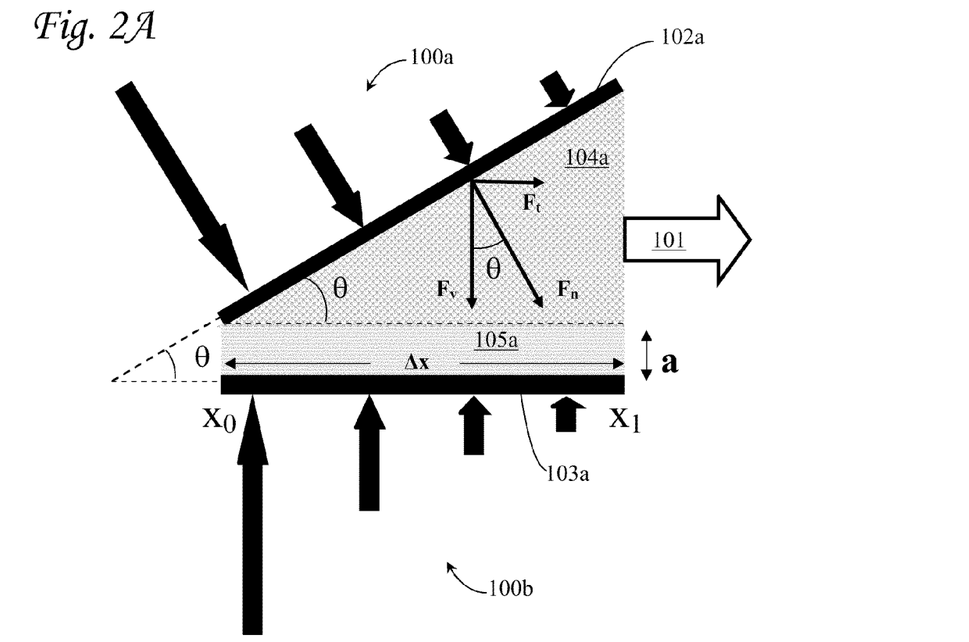
FIG. 2A diagrammatically depicts a detailed resolution of the Cormier-Casimir force components directly generated by effects of normal Casimir force vectors upon a single stage of its non-parallel plate microstructure or nanostructure architecture, and resolution of static forces acting upon an intervening dielectric or semiconductor material in this illustrative embodiment of the present invention.
Figure 2B:
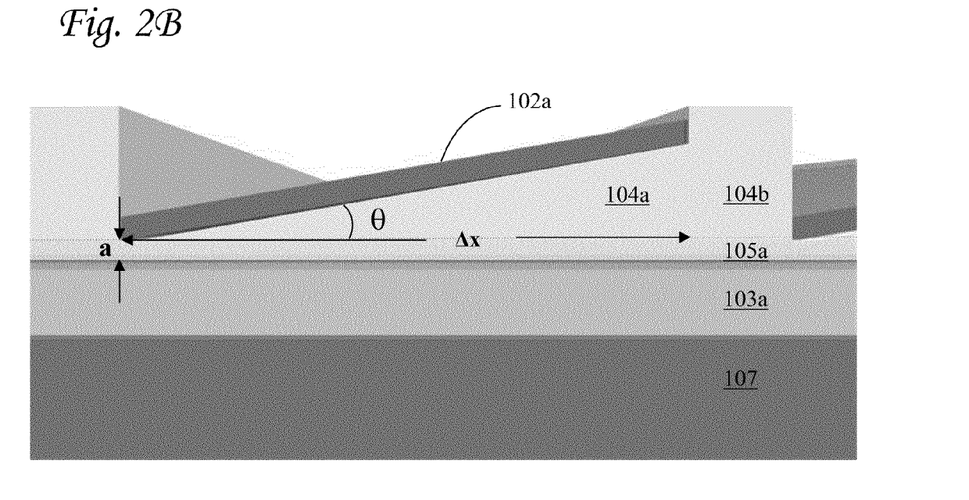
FIG. 2B depicts a three-dimensional side-view (cross-sectional) rendering showing relevant nanostructures and force-controlling parameters of the present invention that govern the physical factors involved with force generation in a CFGD stage.

However, the present Applicant has determined that the proper arrangement of asymmetrical, non-parallel conducting plates can result in an unopposed lateral force component that has been referred to herein as the "Cormier-Casimir force" and its associated generating nanostructure as the "Cormier-Casimir Force Generating Device" or CFGD. Because the present invention generates a Cormier-Casimir force that is non-uniform along its axis of propagation, it is analogous to hydrostatic buoyancy forces; on the other hand, the Cormier-Casimir force has a much greater magnitude. Equation 2 explicitly expresses the general formula for the total Cormier-Casimir force, $F_{cc}$, generated by rectangular non-parallel (i.e., prismatic) conducting plates having a lengthwise axis, L, and a width, $\Delta x$, where the top plate is slanted at an angle, $\theta$, to the one below, and has its closest edge spacing, a, to the lower plate (see FIG. 2A and FIG. 2B):

$$F_{cc} = \frac{\pi^2 \hbar c L}{720} [a^{-3} - (a + \Delta x \tan\theta)^{-3}]. \quad \text{Equation 2}$$

As expected in the case where the conducting surfaces become parallel such that $\theta=0$, the magnitude for the total Cormier-Casimir force, $F_{cc}$, in Equation 2 becomes vanishingly small. For this illustrative embodiment of the present invention, the corresponding nanostructure CFGD is formed epitaxially on a conventional integrated-circuit (IC) substrate. Specifically, a non-parallel conducting plate has been formed as a "gate-type" conductive strip, having electrical properties similar to those of an insulated-gate field-effect transistor (IGFET). The other rectangular electrically conducting layer comprises either a metal, a superconductor or a semiconductor in its conductive state.

Indeed, using a semiconductor substrate wafer provides an almost ideal basis for fabrication of the nanostructure CFGD in the present invention. This is because in addition to affording epitaxial formation methods utilized in fabrication of modern ICs, the silicon-based substrate wafer permits a means for on-chip connection to standard complimentary MOS, or "CMOS", digital logic circuitry (often referred to as "glue logic") to permit building of interfaces to accommodate external computer control. Said interfaces can thereupon connect to standard computer address and data buses to provide a means for precise programmable switching, modulation and control of generated Cormier-Casimir forces.

In addition, utilizing the methods and means described herein permits fabrication of a nanostructure CFGD having very narrow gate-oxide thicknesses to within one nanometer, by employing an architecture similar that found in lateral enhancement-mode MOSFETs, without causing electrode deformation. Such dimensions are possible because the semiconductor substrate remains in an "insulator" or "off" state during the fabrication process, thereby limiting the Cormier-Casimir forces to vanishingly small values at that time. Yet upon completion of the fabrication process, the IC substrate can be switched into a highly conductive or "on" state for generating a very large Cormier-Casimir force component.

Furthermore, the present inventor recognized that the switching properties of the aforesaid CFGD could be enhanced by adding a narrow lightly-doped N-type layer to the IC substrate immediately beneath the non-parallel gate-oxide, thereby providing extra electron carriers to facilitate transition of the CFGD lower plate into a highly-conductive "on" mode. Consequently, one CFGD embodiment described herein can be electronically switched from an "off" to an "on" state, for use in a variety of applications including propulsive means in aeronautical and astronautical systems, as well as in computer-controlled manufacturing, robotics, biotechnology and nanotechnology actuators, and energy conversion systems.

The basic methods and devices for fabrication and operation of a plurality of non-parallel conductors used in the nanostructure CFGDs of the present invention necessary to generate a Cormier-Casimir force by incorporating various substrates have been previously described in the provisional patent application Ser. No. 60/738,847, entitled "Method and Apparatus for a Transverse Casimir Force Generator", filed Nov. 22, 2005, as well as in the provisional patent application Ser. No. 61/010,436, entitled "Method and Device for Generating a Cormier-Casimir Force Under Computer Control", filed Jan. 9, 2008. In addition, the co-pending patent application Ser. No. 11/561,839, entitled "Method and Device to Generate a Transverse Casimir Force for Propulsion, Guidance and Maneuvering of a Space Vehicle", filed Nov. 20, 2006, describes methods and devices that can be reformulated within and extended to the context of the present invention as described herein, all of which are hereby incorporated by reference.

SUMMARY OF THE INVENTION

Some embodiments of the present invention describe an article and device for thermally or electronically switching a lateral or transverse Casimir (i.e., Cormier-Casimir) force, by utilizing a microstructure or nanostructure non-parallel conducting plate array. Microstructures and nanostructures of this type can be manufactured upon semiconductor or insulator substrates. The magnitude of the Cormier-Casimir force can be altered by changing the angle of the non-parallel plates in the microstructure or nanostructure array, or by changing the electrical properties of the nanostructures, or by electronically switching the semiconductor layers underneath the non-parallel plate array. Another means for switching the Cormier-Casimir force of the present invention comprises a superconducting layer cooled below its critical temperature. In addition to propulsion, guidance and maneuvering of space vehicles, some applications of the present invention include precision measurement, vehicle stabilizers, gyroscopes, artificial gravity generators, corrective force generators, energy conversion systems, and other novel, non-obvious devices requiring very constant, precisely controlled forces. Because the present invention utilizes a plurality of microstructures and nanostructures, that ultimately have submicron dimensions, the term "microstructure" has been used hereinafter to refer to both microstructure and nanostructure force-generating devices, articles, or stages.

DESCRIPTION OF THE PREFERRED EMBODIMENTS

Figure 1A:
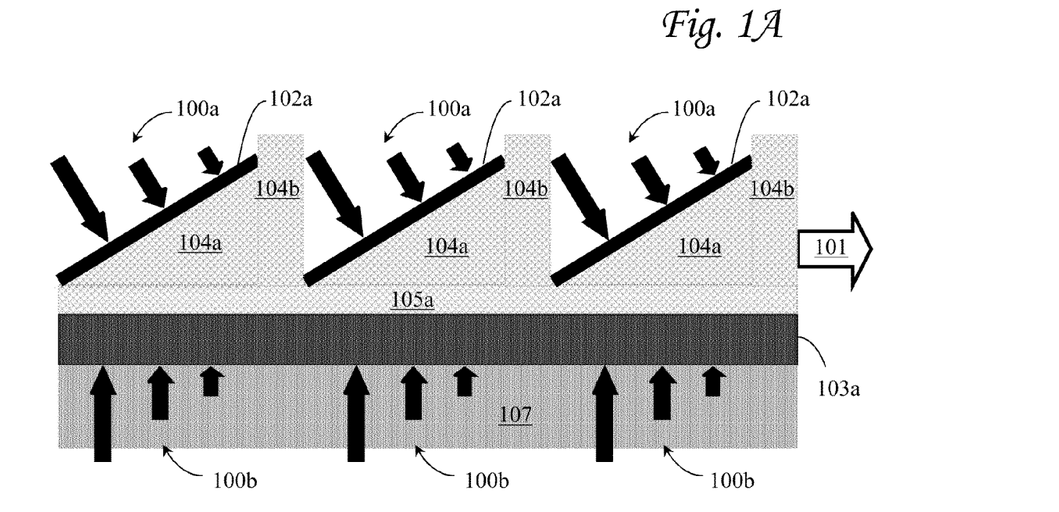
FIG. 1A depicts a cross-sectional view of the present invention showing an illustrative embodiment of three stages using the non-parallel plate array that continuously generates lateral or transverse Casimir force-vector components that can be summated to produce a much larger force and can be thermally switched by using a superconducting layer.

Applying the aforementioned theory relating to the Casimir effect, the present invention directly generates a switchable lateral or transverse (i.e., Cormier-Casimir) force vector 101 directed orthogonally (horizontally) to normal Casimir forces 100a (downward) on the non-parallel conducting plate array, and normal Casimir forces 100b directed upward on the bottom conducting plate 103a, shown in FIG. 1A as a cross-sectional view. The embodiment shown in FIG. 1A comprises a plurality of microstructure or nanostructure CFGD stages, each consisting of a non-parallel conducting plate 102a and shaped prismatic oxide layers 104a and sidewall spacers 104b, forming a nanostructure-array which continuously converts the normal Casimir forces 100a and 100b into transverse or lateral Casimir force components 101 through cumulative vector addition along each of the successive microstructure or nanostructure CFGD stages This plurality of microstructure or nanostructure CFGD stages is deposited upon a thin insulating layer 105a, generally comprised of an oxide having submicron thickness, a, which in turn has been deposited upon a highly conductive bottom layer or plate 103a, typically comprised of metal, polysilicon or other material having low electrical resistance, such as a forward-biased semiconductor or superconductor. The bottom conducting plate 103a interacts with the overlying non-parallel conducting plate array 102a, as shown in FIG. 1A, to continuously generate a Cormier-Casimir force 101 without application of external electrical fields or currents. When using a superconducting layer for the bottom conducting layer 103a, the Cormier-Casimir force 101 can be thermally switched into the "on-state" by cooling said superconducting layer below its critical temperature. To provide strength and stability for the plurality of defining microstructures or nanostructures stages 102a, 104a, 104b and the insulating layer 105a, the aforesaid array has been formed upon a rigid substrate-base layer 107, comprising a variety of first materials selected from the group consisting of diamond, glasses, metallic oxides, polymers, silicon carbides, silicon oxides, sapphires, semiconductors and combinations thereof or similar substances.

A variation on the embodiment of the present invention, shown in FIG. 1A, utilizes a bottom conducting plate 103a formed from a layer of high-temperature Type 2 superconductor cooled below its critical temperature. A typical Type 2 superconductor for this purpose is yttrium-barium-copper-oxide, often abbreviated "YBCO", having the chemical formula $YBa_2Cu_3O_7$. In general, liquid nitrogen can be used to cool a YCBO layer 103a below its critical temperature of 93° K. Besides YBCO, newer-generation high-temperature Type 2 superconductors, sometimes referred to as "perovskites" (metal-oxide ceramics that normally have a ratio of 2 metal atoms to every 3 oxygen atoms) can be utilized for this purpose. For example, the perovskite Type 2 superconductor $(Tl_4Ba)Ba_4Ca_2Cu_{10}O_y$, has a critical temperature of 242° K. Other superconductors in this class include $Tl_5Ba_4Ca_2Cu_{10}O_y$, $(Sn_5In)Ba_4Ca_2Cu_{11}O_y$, $(Sn_5In)Ba_4Ca_2Cu_{10}O_y$, $Sn_6Ba_4Ca_2Cu_{10}O_y$, $(Sn_{1.0}Pb_{0.5}In_{0.5})Ba_4Tm_6Cu_8O_{22+}$, $(Hg_{0.8}Tl_{0.2})Ba_2Ca_2Cu_3O_{8.33}$, or $Tl_2Ba_2Ca_2Cu_3O_{10}$.

By incorporating these newer Type 2 superconductors as the bottom conducting plate 103a, a conventional refrigerant cooling device alone or solid-state Peltier device can be employed to chill a superconducting layer 103a below its critical temperature. When the superconducting bottom-plate layer 103a has been cooled below its critical temperature, the superconducting material transitions to a zero-resistance conductor that interacts strongly with the non-parallel conducting plate array 102a above it to generate a Cormier-Casimir force 101 component. Consequently, the superconducting embodiment of the present invention provides a means of thermal-switching for activation of the Cormier-Casimir force 101 into an "on-state" by cooling the present invention below critical temperatures for the particular superconducting-layer 103a. Conversely, the Cormier-Casimir force 101 can be switched to an "off-state" by warming the superconducting-layer 103a above its respective critical temperature.

Figure 1B:
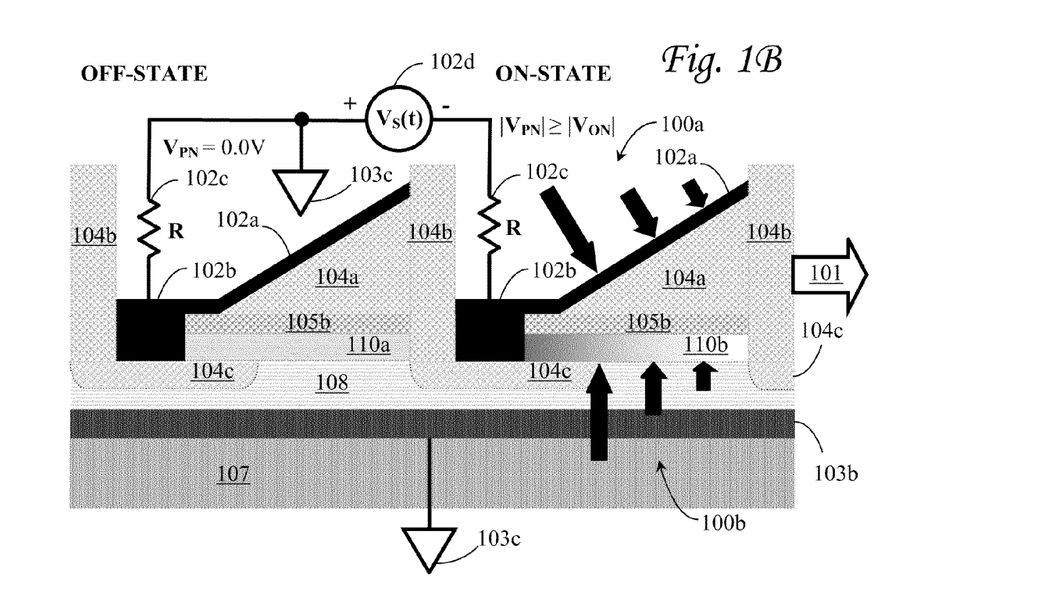
FIG. 1B depicts a cross-sectional view of the present invention showing two stages of an illustrative embodiment in both the "on-state" and "off-state" by employing a PN-junction that can be electronically switched through an externally applied voltage.

Shown in FIG. 1B is a cross-sectional view of another variation for a two-stage CFGD embodiment of the present invention wherein a semiconductor PN-junction, formed by P-type substrate 108 and N-type layer 110a or 110b have been used, instead of a thin insulating layer 105a, to permit switching of the Cormier-Casimir force 101 from an "off-state" to an "on-state" by means of an externally applied voltage source 102d. In the "off-state", CFGD stage depicted in FIG. 1B has no voltage difference or potential (i.e., $V_{PN}=0.0V$) imposed across the PN-junction formed by 110a and P-type substrate 108 through the non-parallel plate electrode 102b. Because this PN-junction voltage, $V_{PN}$, is effectively at zero volts, no current flows through resistor, R, 102c and therefore both the N-layer 110a and P-type substrate 108 exhibit very high resistance causing them to act like insulators.

Moreover, the bottom conducting layer 103b is much farther from the non-parallel conducting plate 102a, in this embodiment, and consequently lateral or transverse Casimir component 101 becomes negligible. Notice that the non-parallel plate electrodes 102b, situated within the recess between the oxide sidewall spacers 104b and the N-type layers 110a and 110b, effectively short out any potential differences between the non-parallel plates 102a and the N-type layers 110a and 110b respectively. However, in the "on-state", time-varying external voltage source 102d, $V_S(t)$, raises the PN-junction voltage, $V_{PN}$, formed across 110b (shading in 110b denotes electron densities) and 108 into its forward-bias level (i.e., $|V_{PN}| \geq |V_{ON}|$) causing said PN-junction to conduct electrical current through resistor, R, 102c, thereby switching the N-type layer 110b into a conducting state whereupon it forms an effective bottom conducting plate that strongly interacts with the non-parallel conducting plate 102a above and generates a substantial lateral or transverse (i.e., Cormier-Casimir) force component 101. As shown in FIG. 1A and FIG. 1B, the rigid substrate-base 107 also provides physical support and stability for the plurality of CFGD nanostructure stages that in turn support the non-parallel conducting plates 102a for both article embodiments of the present invention in FIG. 1A and FIG. 1B. A more detailed illustration of the mechanism for electronic switching of the Cormier-Casimir force component 101 by using a PN-junction, can be seen in FIG. 4A and FIG. 4B.

Fabrication of the microstructure or nanostructure CFGD arrays, shown in FIG. 1A and FIG. 1B, can be accomplished using standard techniques for forming microstructure, nanostructure and integrated circuit articles by employing chemical deposition and etching in conjunction with photoresist or photo-masking preparations, or by vacuum film-deposition or similar methods (e.g., oxidation, precipitation or sputtering) on a standard conducting or superconducting layer 103a. In turn, the conducting or superconducting layer 103a can be deposited or formed atop various types of rigid substrate-base materials 107, including diamond, glasses, metallic oxides, polymers, silicon carbides, silicon oxides, sapphires, semiconductors, related materials and combinations thereof. These embodiments of the present invention can be fabricated as shown in FIG. 1A and FIG. 1B. The variation shown in FIG. 1B can be constructed by substituting the thin insulating layer 105a shown in FIG. 1A with a PN-junction layer, formed by 110a or 110b and P-type substrate 108, thereby permitting electronic modulation or switching of effective insulator thickness, a, in each of the CFGD microstructure or nanostructure CFGD stages. Greater detail for said PN-junctions can be seen in FIG. 4A and FIG. 4B, and as described hereinafter in greater detail.

Shaping for each of the non-parallel conducting plates 102a can be accomplished by repetitively employing sequential photo-masking and differential etching methods, or by repetitively applying reactive-ion or plasma etching to form a plurality of prismatic microstructure or nanostructure CFGD stages. The intervening prismatic dielectric oxides 104a and oxide sidewall spacers 104b can be fabricated by using deposition, differential plasma etching or reactive-ion etching, or other ablative methods in conjunction with photo-masking techniques. Said dielectric oxides 104a and 104b not only provide mechanical stabilization, support and cohesion with the non-parallel conducting plates 102a, but can also alter the magnitude of said Cormier-Casimir force vector 101 when made from special insulators, semiconductors or photo-resistive materials, or by subjecting these materials to an electrical field or electromagnetic radiation.

Portrayed in FIG. 2A is a cross-section of a highly magnified CFGD stage within the present invention to permit detailed representation and decomposition of a normal Casimir force component, $F_n$, into lateral or transverse force vector, $F_t$, and vertical force vector, $F_v$. In addition, FIG. 2A demonstrates how a summated lateral or transverse Casimir force 101 can be directly generated by the present invention through interaction of Casimir force components with non-parallel conducting plate 102a and bottom conducting plate 103a. Through the Casimir effect, conducting plates 102a and 103a, along with intervening prismatic dielectric 104a and oxide layer 105a, restrict a portion of the virtual-particle resonant modes, thereby creating normal Casimir forces 100a and 100b. Because conducting plates 102a and 103a have been arranged in a non-parallel configuration, normal Casimir forces, $F_n$, 100a and 100b form lateral or transverse vector components, $F_t$, and vertical vector components, $F_v$, at each point along the non-parallel conducting plate 102a. As indicated by the arrows, the magnitude of the normal Casimir force vectors, $F_n$, vary with the spacing between the non-parallel plate 102a and bottom plate 103a, and decrease along the x-axis from $x_0$ to $x_1$, which establishes width, $\Delta x$, for each CFGD stage. Correspondingly, the normal Casimir force vectors 100a and 100b diminish as the spacing increases between conducting plates 102a and 103a due to decreasing virtual-particle restrictions which is analogous to a fluid buoyancy force produced by differential pressures that vary with depth. Hence, $F_n$ represents any of the normal Casimir force vectors 100a acting at a point indicated along the non-parallel conducting plate 102a, where θ is the angle subtended with the bottom plate 103a. Because the normal Casimir forces 100a and 100b vary greatly with separation between plates 102a and 103a, their magnitudes also decrease significantly from point $x_0$ to $x_1$ as shown in FIG. 2A. Near $x_0$, the magnitude of the Casimir force is greatest because plates 102a and 103a are only separated by thickness, a, of said insulating oxide layer 105a.

In particular, the vertical component of the Casimir force, $F_v$, has a magnitude that is governed by Equation 1. Since $F_v$ is also equal to $F_n \cos θ$, by trigonometric identity, then the local lateral or transverse Casimir force component, $F_t$, must be $F_n \sin θ$, or $F_v \tan θ$. Therefore, the magnitude of the total Cormier-Casimir force vector 101 for each stage is $F_T$, which can be computed by numerical integration of all the instantaneous transverse force vectors, $F_t$, over interval $x_0$ to $x_1$. Consequently, the magnitude of the total Cormier-Casimir force vector 101, for n microstructure or nanostructure CFGD stages becomes $nF_T$, using the formula shown in Equation 2. However, the introduction of prismatic oxide 104a causes a reduction in the generated lateral or transverse Casimir force vector 101, due to virtual photon scattering (e.g., Casimir-Lifshitz effect), to $kF_T$, as opposed to a vacuum; k is about 50% depending upon the dielectric material. Therefore, Equation 2 can be used in a computer-aided-design (CAD) system to estimate $F_T$ for each microstructure or nanostructure stage by employing the appropriate correction factor.

Viewing the three-dimensional rendering of a single stage for the present invention in FIG. 2B reveals details for construction of each microstructure or nanostructure CFGD stage, and how the parameters controlling the magnitude of the lateral or transverse Casimir force vectors 101 can be adjusted. Angle θ, a parameter used in Equation 2, is determined by the pitch of non-parallel conducting plate 102a relative to bottom oxide layer 105a, due to shaping of intervening prismatic oxide layer 104a. The effective width, $\Delta x$, of each microstructure or nanostructure stage, as well as spacing between each of the successive stages, is determined by the width of the shaped prismatic oxide layer 104a and its extension oxide sidewall spacers 104b.

Minimal conductor plate spacing, a, is consequently determined by oxide layer 105a, which is in turn situated atop either the bottom conducting layer 103a, or N-type layers 110a or 110b respectively. It can clearly be seen that the entire article of the present invention is supported by the rigid substrate-base 107, which also prevents warping of the aforesaid microstructure or nanostructure CFGD stages as well as providing a means for force transmission and maintaining the constancy of physical operating parameters for the present invention. No electrodes or PN-junctions are required for this embodiment of the present invention shown in FIG. 1A because this configuration permits constant force generation without application of external voltages. As previously mentioned, if bulk switching of the Cormier-Casimir force vector 101 is desired, a Type 2 superconductor material can be used for bottom conducting plate 103a, instead of conventional metallic or other conducting materials, to provide thermal switching when cooled below its respective critical temperature.

Figure 3:
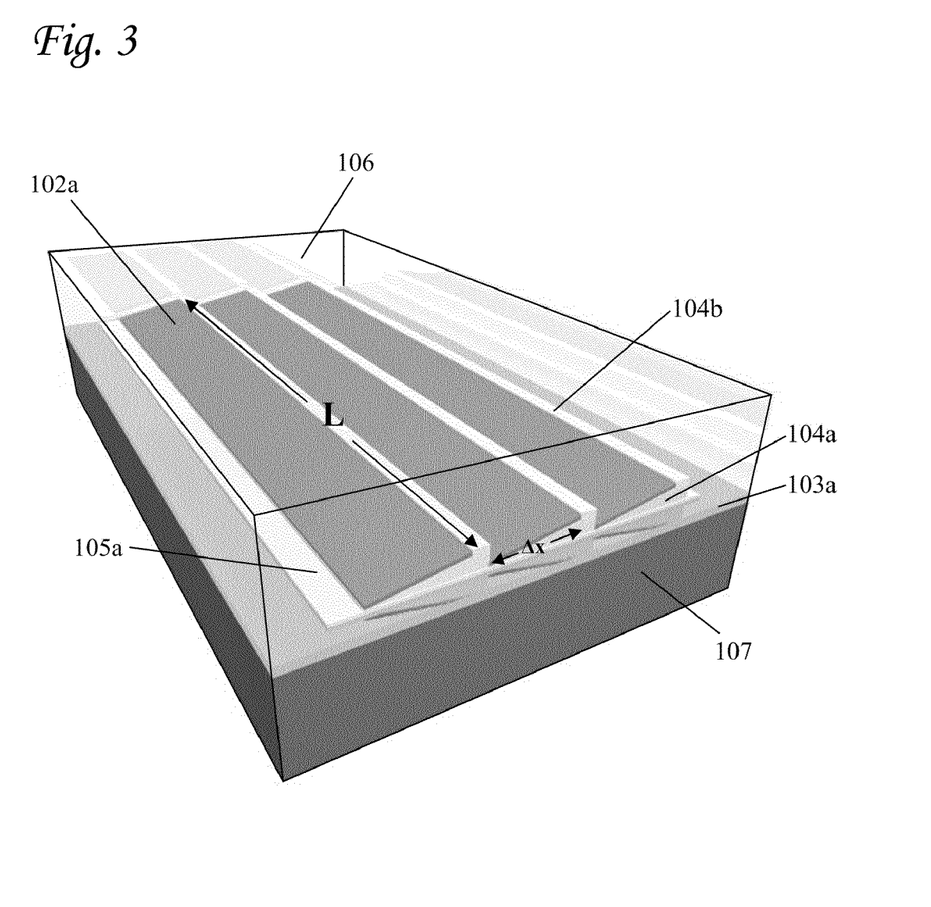
FIG. 3 depicts a three-dimensional rendering of the present invention demonstrating physical construction for three stages of a CFGD article used in the force-directing non-parallel plate array, and showing a side view of nanostructures that allow Cormier-Casimir force generation in this illustrative embodiment.

A physical embodiment for three CFGD stages of the force-generating microstructure or nanostructure article of the present invention can be seen in FIG. 3 as a three-dimensional rendering. This illustrative embodiment of the present invention demonstrates physical means for constructing a plurality of force-generating microstructure or nanostructure CFGD stages, comprising said non-parallel conducting-plate array 102a and situated atop prismatic oxide layers 104a and sidewall spacers 104b, also shown in FIG. 1A. Said microstructure or nanostructure CFGD stages when formed atop a deposited oxide layer 105a and bottom conducting plate 103a can continuously generate said Cormier-Casimir force vector 101. Summated lateral or transverse Casimir force components, $F_t$, shown in FIG. 2A, can thereupon be transmitted through successive prismatic oxide layers 104a and their respective sidewall spacers 104b for each stage as depicted in FIG. 3 and in cross-section in FIG. 2A, thereby generating the total Cormier-Casimir force vector 101 through force transmission within oxide layer 105a and bottom conducting plate 103a to supporting substrate-base 107. Furthermore, prismatic oxide layers 104a and their sidewall spacers 104b, situated atop the bottom oxide layer 105a, create the minimal spacing parameter, a, thereby establishing the magnitude of the Cormier-Casimir force components for each aforesaid microstructure or nanostructure CFGD stage respectively.

Besides fabricating additional microstructure or nanostructure CFGD stages, FIG. 3 demonstrates that the magnitude for the total Cormier-Casimir force vector 101 can also be increased to the desired level by extending, length, L, for each stage. This entire microstructure or nanostructure article has been constructed upon a rigid substrate-base layer 107, which not only provides physical support for the bottom conducting plate 103a, but also permits construction of an article having a large number of CFGD stages. An encapsulation layer 106 has also been shown in FIG. 3, which provides both physical support and protection for said plurality of non-parallel conducting plates 102a from physical abrasion, oxidation or high-energy radiation (e.g., gamma or cosmic radiation). Encapsulation layer 106 can be fabricated by molding or deposition techniques. Moreover, encapsulation layer 106 can be comprised of a polymer or other durable insulating material.

As previously mentioned, adjusting the total Casimir force vector 101 can be accomplished by varying physical parameters of the article and device for the present invention shown in FIG. 3. For example, each microstructure or nanostructure CFGD stage in the non-parallel conducting plate array 102a has an effective force-generating area, A, where A=LΔx such that $\Delta x = x_1 - x_0$. Hence, a plurality of microstructure or nanostructure CFGD stages can be bonded as a unit thereby causing the magnitude of the summated Cormier-Casimir force vector 101 to be increased as needed. Consequently, physical methods for increasing the summated lateral or transverse Casimir force vector 101 include extending length L, decreasing minimal separation a, or by adding more microstructure or nanostructure CFGD stages to the non-parallel conducting plate array 102a, which in turn increase force components for generating a thrust vector for maneuvering, guidance and propulsion in a space vehicle as described herein and shown in FIG. 5. In addition, the present invention can furnish precision forces for a variety of other applications as herein described.

Figure 4A:
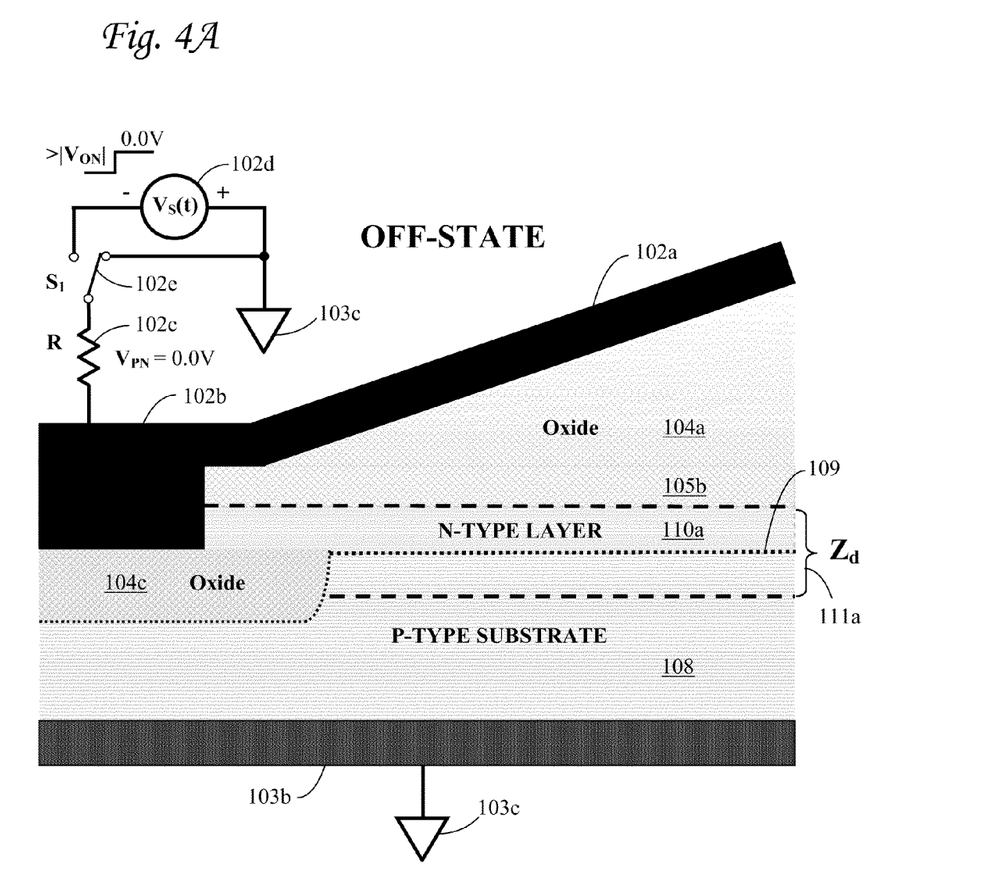
FIG. 4A depicts a highly magnified cross-sectional view for a switchable CFGD stage, in this illustrative embodiment of the present invention, electronically switched into its "off-state" wherein a zero-biased PN-junction has been used to effectively increase the conducting-plate separation and thereby greatly reduce generation of Cormier-Casimir (lateral or transverse) force components.
Figure 4B:
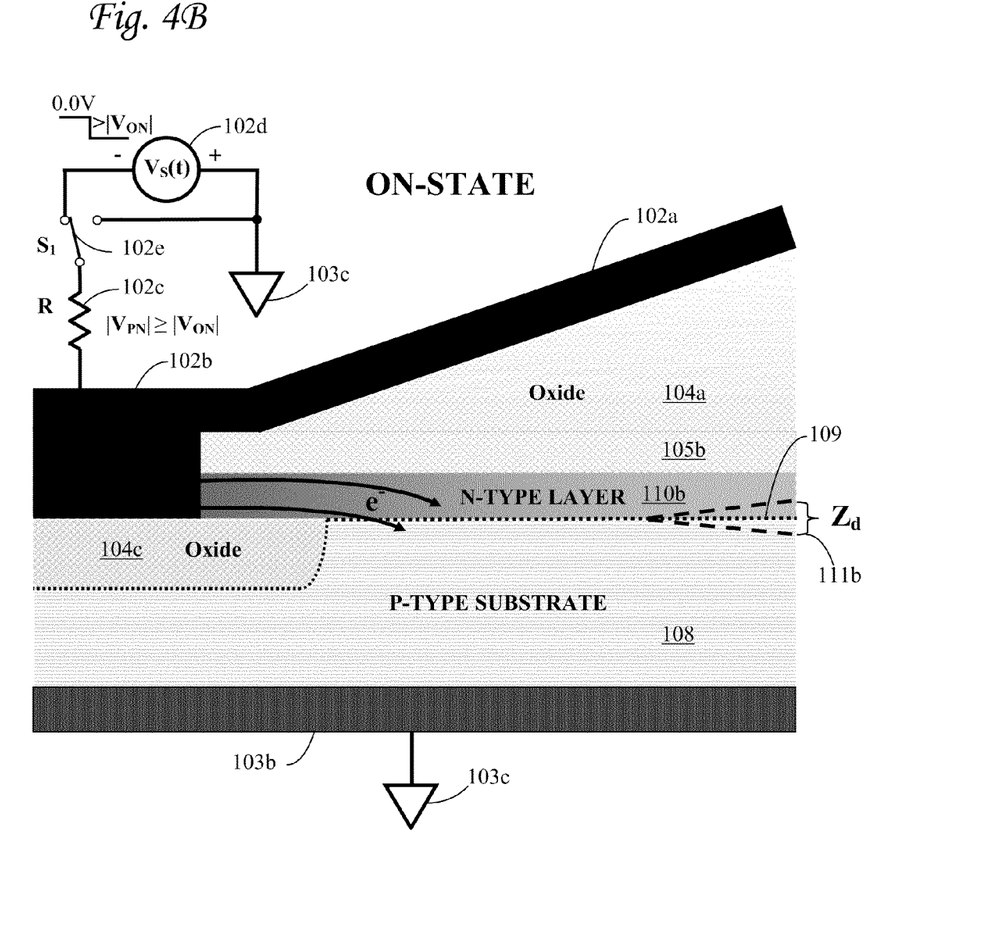
FIG. 4B depicts a highly magnified cross-sectional view for a switchable CFGD stage, in this illustrative embodiment of the present invention, electronically switched into its "on-state" wherein an external voltage forward-biases a PN-junction to greatly reduce effective plate separation, and thereby produce a very large Cormier-Casimir force.

Enlarged views of the PN-junction embodiment for the present invention, shown in FIG. 1B, have been portrayed in FIG. 4A and FIG. 4B to elaborate upon an electronic and mechanical means for switching said Cormier-Casimir force 101 into "on-" or "off-states". In this illustrative embodiment of the present invention, a PN-junction semiconductor structure has been substituted for the insulating layer 105a by using thin N-type layers 110a or 110b and P-type semiconductor substrate 108, where either silicon or germanium are typically utilized for this purpose. By employing standard semiconductor fabrication techniques, said N-type semiconductor layer 110a or 110b can be thinly grown or diffused onto the P-type substrate 108 to form the PN-junction layer 109 depicted in FIG. 4A and FIG. 4B. Due to charge migration, a depletion zone 111a of thickness $Z_d$ forms around said PN-junction layer 109, shown in FIG. 4A, which lacks free charge carriers. Hence depletion zone 111a acts like an insulator in absence of electrical currents, where junction voltage, $V_{PN}$, is held at zero either by voltage source $V_S(t)$ or when the single-pole single-throw (SPST) switch $S_1$ 102e is manually set to the ground contact, as shown in FIG. 4A, thereby forcing the "off-state". Such a manual-override switch 102e can be used for emergency shutdown procedures.

Alternatively, the magnitude of $V_{PN}$ from voltage source 102d can be driven less than zero to effectively reverse-bias PN-junction 109 into the "off-state", and thereby further increase electrical resistance in the N-type layer 110a. Hence, FIG. 4A depicts the "off state" for a particular CFGD stage of the present invention whereby only negligible Cormier-Casimir force vectors 101 are generated. Because the N-type layer 110a is in electrical contact with the top non-parallel conducting plate 102a through adjacent electrode 102b, which is an extension of conductor 102a, application of external ground potential (0.0V) from voltage source 102d via connectors to electrode 102b prevents electrical currents from flowing through said PN-junction layer 109 via resistor, R, 102c, causing PN-junction 109 to be forced into the "off-state".

Also shown in FIGS. 4A and 4B is buried oxide implant or region 104c, which is a further extension of prismatic oxide layer 104a; buried oxide implant 104c greatly reduces leakage currents from electrode 102b, while also helping to inject and channel electrons (majority-charge carriers) into N-type layer 110b, as shown in FIG. 1B and FIG. 4B. The increased "on-state" differential electron densities within 110b (where shading indicates electron densities and currents in the N-type layer 110b, as shown in FIG. 1B and FIG. 4B) also increases the magnitude of the Cormier-Casimir forces 101 due to the channeling effect of buried oxide implants 104c. Ultimately, electrons from said PN-junction 109 flow through P-type substrate 108 to conducting plate 103b which thereupon forms an electrical ground contact 103c for the entire article of the present invention.

Because the N-type layer 110a is very thin, the "off-state" depletion zone 111a occupies its entire width at zero bias (i.e., a zero external voltage from $V_S(t)$ 102d or from grounding switch $S_2$ 102e) where $V_{PN}=0.0V$, and causes its electrical resistance to be very high throughout. To reduce majority carriers (i.e., electrons) in the depletion zone, $Z_d$, 111a even more during the "off state", a reverse-bias potential can be applied from external voltage source 102d via connectors to electrode 102b, as long as this potential difference across PN-junction 109 remains below breakdown voltage. Hence, in a zero-biased or reverse-biased condition, the insulating depletion-zone 111a becomes wide enough to encompass the entire N-type layer 110a, whereas the P-type substrate becomes slightly conductive well below depletion zone 111a. Consequently, in the "off state" effective minimal separation, a, between non-parallel conducting plate 102a and the next conducting layer 103b widens to about the thickness of P-type substrate 108. This separation is much wider than insulating layer 105b, causing that stage's component of the Cormier-Casimir force 101 to drop to a very low magnitude.

Conversely, FIG. 4B demonstrates how the "on state" occurs when a switched forward-bias voltage is applied to the PN-junction 109 (e.g., over 0.6 volts for silicon PN-junctions), via connectors to electrode 102b from external voltage source $V_S(t)$ 102d such that $|V_{PN}|>|V_{ON}|$, and when switch $S_1$ 102e has been set to the on-position causing electrons to flow through resistor, R, 102c. This electron current floods N-type layer 110b with majority charge carriers, channeled to high current densities by buried oxide implant 104c, greatly reducing depletion zone 111b. As a result, N-type layer 110b now acts like a bottom-plate conductor for non-parallel conducting plate 102a, causing the effective minimal separation parameter, a, to narrow to the width of oxide layer 105b or less, amounting to only several atomic diameters. This effective narrowing of oxide layer 105b to an extremely small width produces a tremendous increase in the generated Cormier-Casimir force vector 101 thereby switching this CFGD-stage into the "on state".

Thus, utilization of the PN-junction 109 in the present invention allows the directly-generated Cormier-Casimir force 101 to be electronically switched from an "off-state" to an "on-state" by application of a forward-biasing external voltage from $V_S(t)$ 102d across electrode 102b and bottom conductor 103b. However, it should be noted that because the non-parallel conducting plate 102a and its corresponding electrode 102b are in direct electrical contact with N-type layer 110a and 110b respectively, no voltage differential exists across prismatic oxide layer 104a or insulating layer 105b. An additional benefit of said PN-junction 109 fabrication technique described herein is that it minimizes warping or distortion of the microstructure or nanostructure stages by preventing unwanted Casimir forces during formation of the top non-parallel conducting plate 102a and the intervening prismatic oxide layers 104a and 105b. Moreover, electronic switching of said Cormier-Casimir force 101 provides for a space vehicle that can be constructed with maneuvering, guidance and propulsion systems without the need for moving parts, thereby greatly increasing the reliability and lifetime of these systems.

Figure 5:
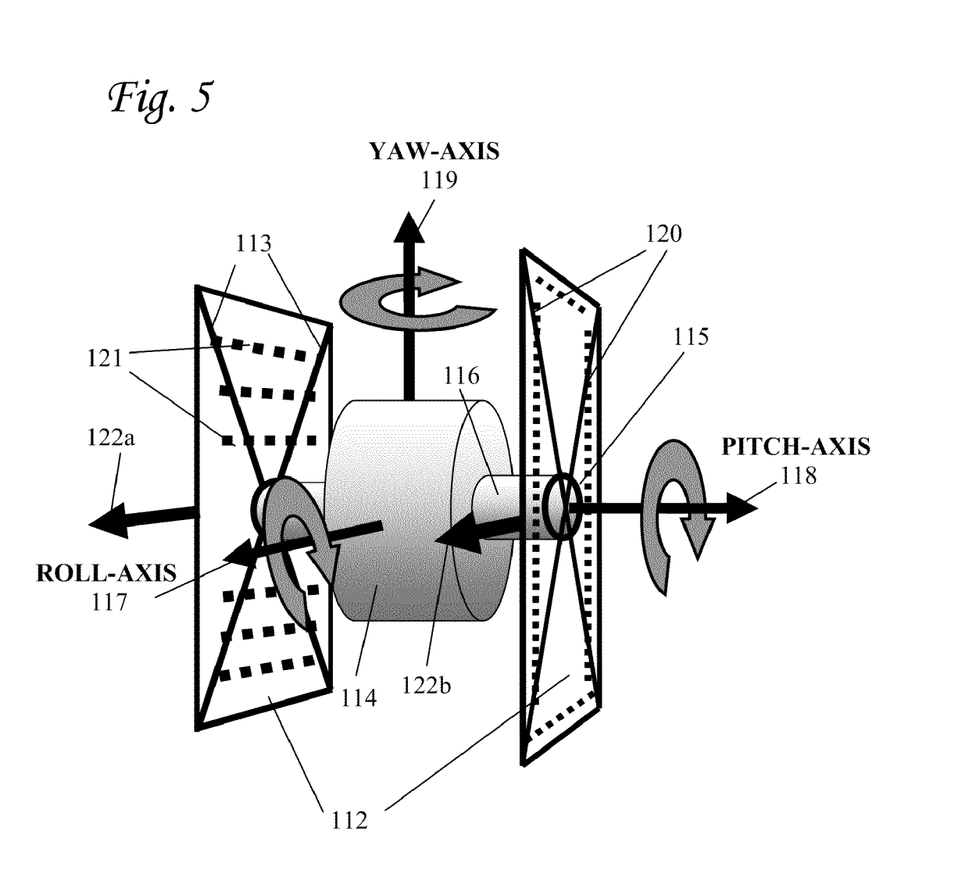
FIG. 5 depicts in diagrammatic form an illustrative embodiment of the present invention incorporated to provide thrust, guidance and maneuvering for a manned or unmanned space vehicle by utilizing a plurality of switchable CFGDs described herein.

FIG. 5 depicts an illustrative embodiment for applying said Cormier-Casimir force vector 101 described herein as a means to provide maneuvering, guidance and propulsion for a manned or unmanned space vehicle. Casimir drive panels 112 support a plurality of aforesaid microstructures or nanostructures, depicted in FIG. 1A and FIG. 1B, sufficient to furnish said space vehicle with vectored thrust for maneuvering, guidance and propulsive systems. Most of the microstructure or nanostructure articles 121 have been mounted in rows on said drive panels 112 in the same direction to provide starboard 122a and port 122b thrust vectors to propel the vehicle's fuselage 114. A smaller number of said Cormier-Casimir force-generating devices (CFGDs) 120 can be mounted around the perimeter of the Casimir drive panels 112 to provide thrust for guidance and maneuvering. Aerodynamic design is not necessary because there are no lift or drag forces in outer space.

To add stability and reliability, the Casimir drive panels 112 are held in place on both sides by supporting struts 113, which attach to said space vehicle's axle-pivots 115, thereby allowing rotation around axles 116 and corresponding transfer of maneuvering and propulsive forces to the space vehicle's fuselage 114 via axles 116. Because the Cormier-Casimir force vector 101 can be electronically switched, some force-generating microstructure or nanostructure articles of the present invention can be oriented in different directions at appropriate locations on the Casimir drive panels 112 to control roll, pitch and yaw maneuvers.

In the case of pitch-maneuvers, tandem microstructure or nanostructure article components, depicted in FIG. 1A and FIG. 1B, can be mounted along the perimeter of the Casimir drive panels 112. Accordingly, direction of said mounted microstructure or nanostructure articles 120 and 121, that produce the Cormier-Casimir force vector 101, can be reversed at opposite ends of the Casimir drive panels 112, thereby creating a torque around the pitch-axis 118 when switched to the "on-state" electronically by applying a forward bias to all desired PN-junctions 109.

There are several ways to initiate maneuvers around the roll-axis 117 or yaw-axis 119. For roll-maneuvers, the Casimir drive panels 112 can be rotated in opposite directions on axle-pivots 115, thereby providing torque around the roll-axis 117 through differing magnitudes of starboard force vector 122a and port force vector 122b. Alternatively, maneuvering microstructure or nanostructure articles 120, situated on the periphery of both drive panels 112, can either point in opposite directions, or have differential force magnitudes when switched to the "on-state" electronically, thereby eliminating the need for rotation of Casimir drive panels 112 around axle-pivots 115. Similarly, yaw-maneuvers can be executed in virtually the same manner as roll-maneuvers because of the radial symmetry of these axes around the pitch-axis 118. Another method for executing roll or yaw maneuvers can be accomplished by keeping the starboard 122a and port 122b thrust vectors pointing in the same direction, but having their magnitudes vary instead.

As mentioned previously herein, starboard 122a and port 122b propulsive thrust vectors for accelerating said vehicle's fuselage 114 can be produced by mounting a majority of said force-generating microstructure or nanostructure articles 121 of the present invention in the same direction throughout each Casimir drive panel 112. However, sections of said force-generating articles 121 can be selectively switched "on" or "off" independently of each other to provide varying levels of propulsive thrust or trim settings for either manned navigation or unmanned computer-controlled guidance of said space vehicle utilizing the present invention.

The only onboard electrical power required to propel an unmanned version of the present invention would be for energizing onboard computer avionics, telemetry systems and motors to occasionally rotate the Casimir drive panels 112, and to furnish voltage for switching the microstructure or nano structure PN-junctions 109 into the "on-state". In a manned version of the present invention, power would also be needed for life-support systems within the vehicle's fuselage 114. Because the present invention utilizes direct-conversion of the Casimir force into thrust, no reaction mass is required for maneuvering, guidance or propulsion of said space vehicle. An additional feature of the said space vehicle's design is that it can be set into a constant rotation around pitch-axis 118 to create an artificial gravity for a crew around the inner perimeter of the vehicle's fuselage 114, or instead, an artificial gravity can be generated simply by maintaining constant magnitude for starboard 122a and port 122b propulsive thrust vectors.

All the above examples represent an important advance in the field of the present invention, especially in applications dealing with lateral or transverse Casimir force generation for positioning, guidance, maneuvering and propulsion systems for both manned and unmanned space vehicles, plus any non-obvious application requiring use of precise forces. Furthermore, the concept of a lateral or transverse Casimir force generator permits entirely new engineering modalities including non-obvious applications involving weights and measures, aircraft and satellite guidance, propulsive drives, and power conversion systems.

It is to be understood that the above-described embodiments and variations thereon are merely illustrative of the present invention and that many additional variations can be devised by those skilled in the art without departing from the scope of the invention. It is therefore intended that such variations be included within the scope of the present invention and its equivalents.

REFERENCES

Buks, E. and Roukes, M. L., "Quantum physics: Casimir force changes sign", Nature 419, Sep. 12, 2002, pp. 119-120.

Chan, H. B. et al., "Quantum Mechanical Actuation of Microelectromechanical Systems by the Casimir Force", Science vol. 291, pp. 1941-1944, Mar. 9, 2001, with corrections.

Chen, F. and Mohideen, U., "Demonstration of the Lateral Casimir Force", Phys. Rev. Lett. 88 101801 (Feb. 25, 2002), http://link.aps.org/abstract/PRL/v88/e101801

Einstein, A. and Hopf, L., Ann. Phys., 33, 1096 (1910a); Ann. Phys., 33, 1105 (1910b).

Forward, R. L., "Extracting Electrical Energy From the Vacuum by Cohesion of Charged Foliated Conductors," Phys. Rev. B, 30(4), 1700-1702 (August 1984), http://www.calphysics.org/articks/Forward1984.pdf.

Forward, R. L., "Apparent Endless Extraction of Energy From the Vacuum by Cyclic Manipulation of Casimir Cavity Dimensions," Proc. NASA Breakthrough Propulsion Physics Wkshp., Cleveland, Ohio (Aug. 12-14, 1997).

Lambrecht, A. "The Casimir effect: a force from nothing", Physics World September 2002, http://physicsweb.org/article/world/15/9/6.

Lamoreaux, S. K., "Demonstration of the Casimir Force in the 0.6 to 6 µm Range", Phys. Rev. Lett. 78, 5-8 (1997), http://link.aps.org/abstract/PRL/v78/p5.

Lamoreaux, S. K., "Resource Letter CF-1: Casimir Force," Am. J. Phys., 67(10), 850-861 (October 1999).

Milonni et al., "Casimir Forces," Contemporary Physics, 33(5), 313-322 (1992).

Mohideen, U. and Anushree Roy, "Precision Measurement of the Casimir Force from 0.1 to 0.9.mu·m", Phys. Rev. Lett., vol. 81, No. 21, pp. 4549-4552, Nov. 23, 1998.

Van Enk, S. J., "Casimir torque between dielectrics", Phys. Rev. A, vol. 52, No. 4, pp. 2569-2575, October 1995.

Xin-zhou Li, et al., "Attractive or repulsive nature of the Casimir force for rectangular cavity", Phys. Rev. D, vol. 56, No. 4, pp. 2155-2162, Aug. 15, 1997.

What I claim is:

1. A switchable microstructure or nanostructure article comprising:
- a first insulating substrate-base having a surface;
- a first switchable electrically conductive layer deposited or formed atop said first insulating substrate-base;
- a thin oxide layer having submicron thickness deposited atop said first switchable electrically conductive layer;
- a repeatedly shaped insulating layer comprising a plurality of prismatic oxide stages, having non-parallel surfaces and sidewall spacers, deposited and formed atop said thin oxide layer therebeneath;
- a plurality of repetitively deposited metal layers forming non-parallel conducting plates covering non-parallel surfaces of said prismatic oxide layer therebeneath;
- a polymer encapsulating layer deposited atop said prismatic oxide layer and metal layers therebeneath.

2. The article of claim 1 wherein material of said non-parallel conducting plates further comprises at least one of the group of conductive metals, polysilicon or other materials having a low electrical resistance, and combinations thereof.

3. The article of claim 1 wherein material of said first electrically conductive layer further comprises at least one of the group of Ag, Al, Au, Co, Cu, Ni, Mo, Pb, Pt, Ta, Ti, W, their respective silicides, and combinations thereof.

4. The article of claim 1 wherein said first switchable electrically conductive layer further comprises a plurality of semiconductor PN-junctions, having a conductive layer therebeneath, deposited or formed atop said first insulating layer, to permit individual electrical switching into a conductive "ON-state" when forward biased.

5. The article of claim 4 wherein said semiconductor PN junction layer further comprises a thick P-type semiconductor layer formed onto a conductive layer therebeneath, and having a plurality of diffused or deposited buried-oxide implants therein to provide additional electrical isolation and improved switching characteristics.

6. The article of claim 4 wherein said semiconductor PN junction layer further comprises a thick P-type semiconductor layer upon which a plurality of rectangular N-type layers have been epitaxially deposited or implanted having submicron thickness, electrically isolated from each other, partially covering said buried-oxide implants, and forming PN junctions with said P-type layer therebeneath.

7. The article of claim 1 wherein said thin oxide layer further comprises a plurality of deposited rectangular thin oxide layers each covering N-type layers of said PN-junctions.

8. The article of claim 1 wherein material of said first insulating substrate-base further comprises at least one of the group of diamond, glasses, metallic oxides, polymers, silicon carbides, silicon oxides, sapphires, semiconductors and combinations thereof.

9. The article of claim 1 wherein material of said first switchable electrically conductive layer further comprises a uniform superconductor to permit thermal switching into a conductive on-state when cooled below its critical temperature.

10. The article of claim 9 wherein said superconducting material further comprises a Type 2 high-temperature superconductor comprising at least one of the group of $(Tl_4Ba)Ba_4Ca_2Cu_{10}O_y$, $Tl_5Ba_4Ca_2Cu_{10}O_y$, $(Sn_5In)Ba_4Ca_2Cu_{11}O_y$, $(Sn_5In)Ba_4Ca_2Cu_{10}O_y$, $Sn_6Ba_4Ca_2Cu_{10}O_y$, $(Sn_{1.0}Pb_{0.5}In_{0.5})Ba_4Tm_6Cu_8O_{22+}$, $(Hg_{0.8}Tl_{0.2})Ba_2Ca_2Cu_3O_{8.33}$, or $Tl_2Ba_2Ca_2Cu_3O_{10}$ and combinations thereof.

* * * * *